United States Patent [19]

Engler et al.

[11] Patent Number: 5,730,244

[45] Date of Patent: Mar. 24, 1998

[54] LIGHTWEIGHT HYDRAULIC POWER STEERING GEAR

[75] Inventors: Thomas J. Engler, Los Angeles; James M. Zamel, Hermosa Beach; Jon W. Martin, Los Alamitos, all of Calif.

[73] Assignee: TRW Inc., Lyndhurst, Ohio

[21] Appl. No.: 593,950

[22] Filed: Jan. 30, 1996

[51] Int. Cl.$^6$ ........................................ B62D 5/12
[52] U.S. Cl. ........................... 180/417; 180/428; 180/439
[58] Field of Search ............................... 180/417, 426, 180/427, 428, 439

[56] References Cited

U.S. PATENT DOCUMENTS

| | | |
|---|---|---|
| 3,777,589 | 12/1973 | Adams ........................................ 74/498 |
| 4,788,877 | 12/1988 | Robinson et al. ........................ 74/388 PS |
| 4,809,806 | 3/1989 | Pietrzak et al. ............................ 180/428 |
| 4,986,382 | 1/1991 | Harrison .................................... 180/428 |
| 5,213,174 | 5/1993 | Adams ....................................... 180/147 |
| 5,213,175 | 5/1993 | Feindel ..................................... 180/148 |
| 5,285,864 | 2/1994 | Martin et al. ............................ 180/417 |

*Primary Examiner*—Kevin Hurley
*Attorney, Agent, or Firm*—Tarolli, Sundheim, Covell, Tummino & Szabo

[57] ABSTRACT

A lightweight housing (12) for a hydraulic power steering gear (10) includes a tubular structure (34 or 68) with a longitudinal central axis (21 or 23). The tubular structure (34 or 68) has layers extending circumferentially around the axis (21 or 23), including an inner layer (100), an outer layer (102), and an intermediate layer (104) between the inner and outer layers (100 and 102). The inner layer (100) is formed of plastic material. An inner surface (118 or 120) of the inner layer (100) defines an outer boundary of a space (36,38 or 88) containing hydraulic fluid under pressure. The outer layer (102) is formed of metal material. The intermediate layer (104) is formed of elastomeric material, and is compressively loaded radially between the inner and outer layers (100 and 102).

17 Claims, 4 Drawing Sheets

LIGHTWEIGHT HYDRAULIC POWER STEERING GEAR

FIELD OF THE INVENTION

The present invention relates to a hydraulic power steering gear for steering a vehicle, and particularly relates to a hydraulic power rack and pinion steering gear.

BACKGROUND OF THE INVENTION

A hydraulic power rack and pinion steering gear includes an elongate steering rack, a pinion gear, and a hydraulic fluid control valve. The rack is movable longitudinally, and is connected at its opposite ends to a vehicle steering linkage. When the rack moves, it actuates the steering linkage to effect steering movement of an associated pair of steerable vehicle wheels.

A piston is fixed to the rack. The piston is supported for sliding movement in a power cylinder under the influence of hydraulic fluid pressure in the power cylinder. The valve is contained in a valve housing, and operates to control the pressure in the power cylinder in response to steering input from an operator of the vehicle. The valve thus causes the piston, and hence the rack, to move in response to the steering input so that the vehicle wheels are steered in response to the steering input.

The power cylinder and the valve housing are constructed with sufficient strength to contain and support the corresponding parts of the steering gear, and also to withstand the temperature and pressure of the hydraulic fluid. Therefore, the power cylinder and the valve housing are typically constructed of metal materials, such as aluminum and steel.

SUMMARY OF THE INVENTION

In accordance with the present invention, an apparatus comprises housing means for containing hydraulic fluid under pressure in a hydraulic power steering gear. The housing means comprises a tubular structure with layers extending circumferentially around a longitudinal central axis. The layers include an inner layer, an outer layer, and an intermediate layer between the inner and outer layers.

The inner layer of the tubular structure is formed of plastic material. An inner surface of the inner layer defines an outer boundary of a space for containing the hydraulic fluid under pressure. The outer layer is formed of metal material, and comprises pressure-bearing means for resisting the pressure of the hydraulic fluid. The intermediate layer is formed of elastomeric material, and is compressively loaded radially between the inner and outer layers.

In a preferred embodiment of the present invention, the housing means has a first tubular portion defining at least one variable volume hydraulic fluid chamber. A piston on a steering rack is supported for axial movement in the first tubular portion of the housing means in sliding contact with the inner surface of the inner layer. The housing means in the preferred embodiment further has a second tubular portion containing a hydraulic fluid control valve. A valve sleeve in the control valve is supported for rotation in the second tubular portion of the housing means in sliding contact with the inner surface of the inner layer.

A hydraulic power steering gear constructed in accordance with the present invention has a relatively lightweight structure. This is because the inner layer and the intermediate layer of the housing means are both formed of non-metal materials, e.g., nylon and rubber, respectively. The outer layer, which is formed as a thin sheet of stamped metal, can provide substantially all of the strength and rigidity needed for the housing means to support the rack, a pinion gear, and other conventional parts of a power steering gear, as well as to contain the hydraulic fluid at the elevated temperature and pressure levels experienced in a power steering gear. The intermediate layer is contracted and extended under a compressive load between the inner and outer layers so as to fill any voids that might otherwise exist between those layers as a result of manufacturing tolerances. The intermediate layer thus ensures that all three layers fit closely and firmly against each other.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
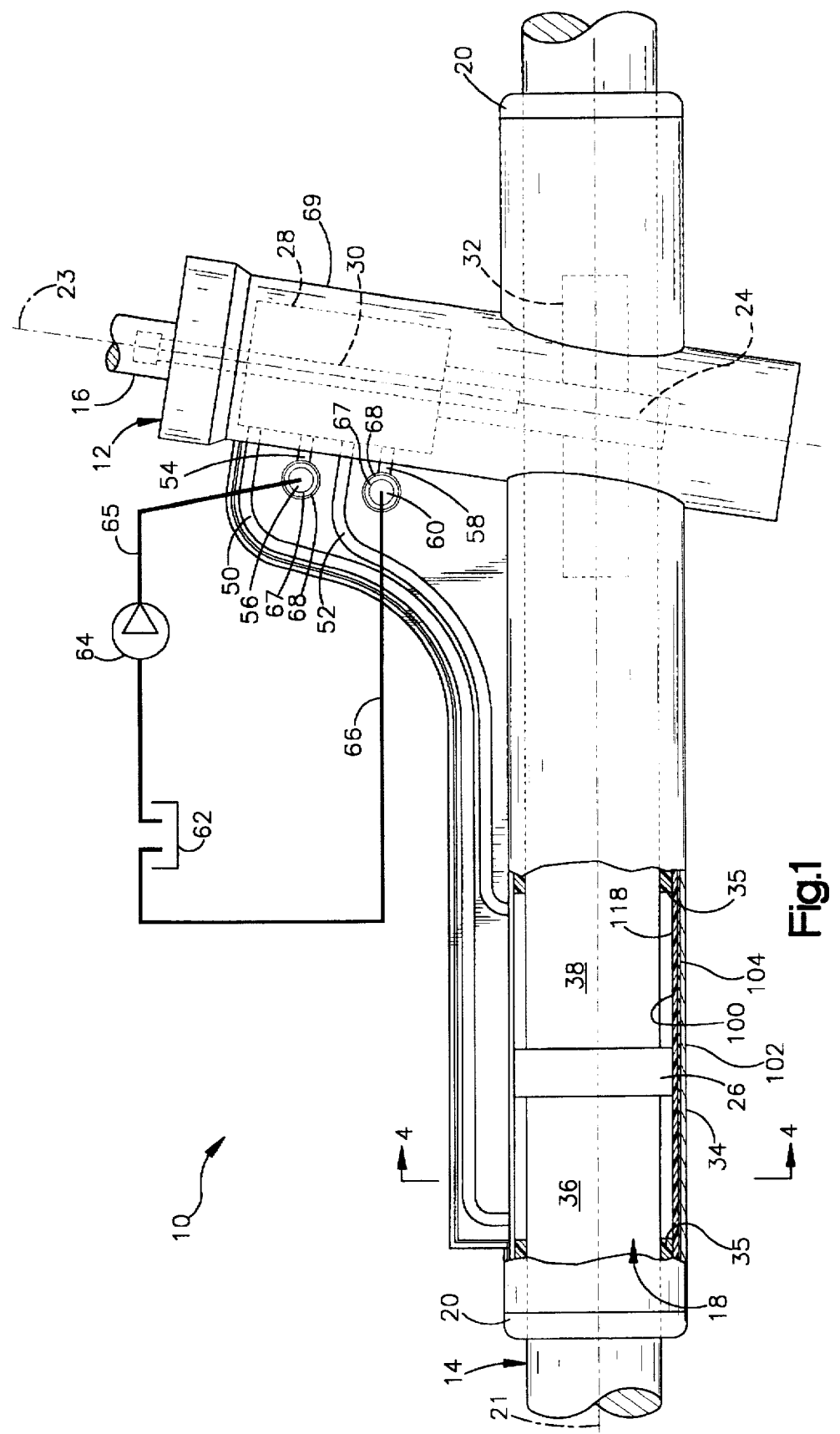
FIG. 1 is a partly schematic, partly sectional view of a hydraulic power steering gear comprising a preferred embodiment of the present invention.

A hydraulic power steering gear 10 comprising a preferred embodiment of the present invention is shown in FIG. 1. The steering gear 10 is a hydraulically-assisted rack and pinion steering gear including a housing 12, an elongate steering rack 14, and an input shaft 16.

The rack 14 extends longitudinally through a passage 18 in the housing 12, and projects longitudinally outward from opposite ends of the passage 18. A pair of bushings 20 at the opposite ends of the passage 18 support the rack 14 for longitudinal movement along a horizontal central axis 21 of the passage 18. The rack 14 has opposite end portions (not shown) which are connectable with a pair of steerable vehicle wheels through a steering linkage in a known manner.

The input shaft 16 is connectable with a manually operated vehicle steering wheel, as known in the art, and is rotatable about a relatively vertical axis 23 in response to rotation of the steering wheel by an operator of the vehicle. The steering gear 10 operates to move the rack 14 longitudinally in response to rotation of the input shaft 16. The steering gear 10 thus actuates the steering linkage to effect steering movement of the vehicle wheels in response to rotation of the steering wheel.

As shown schematically in FIG. 1, the steering gear 10 further includes a pinion gear 24, a piston 26, and a hydraulic fluid control valve 28, each of which is contained in the housing 12. The pinion gear 24 is connected with the input shaft 16 by a torsion bar 30, and is supported for rotation about the axis 23 in meshing engagement with a row of rack teeth 32 on the rack 14. The piston 26 is fixed to the rack 14, and is contained in a horizontally extending tubular portion 34 of the housing 12 which functions as a power cylinder. A pair of seals 35 also are contained in the power cylinder 34. The seals 35 define opposite ends of a pair of variable volume hydraulic fluid chambers 36 and 38 which are located in the power cylinder 34 on opposite sides of the piston 26.

The valve 28 communicates with the first chamber 36 in the power cylinder 34 through a first two-way fluid flow passage 50. The valve 28 further communicates with the second chamber 38 in the power cylinder 34 through a second two-way fluid flow passage 52. The two-way flow passages 50 and 52 are defined by inner surface portions of the housing 12, as described fully below.

The housing 12 also defines an inlet passage 54 with an inlet port 56 and an outlet passage 58 with an outlet port 60. As shown schematically in FIG. 1, the valve 28 receives hydraulic fluid from a reservoir 62 and a pump 64 through a hydraulic fluid inlet line 65 connected to the inlet port 56. The valve 28 exhausts hydraulic fluid to the reservoir 62 through a hydraulic fluid outlet line 66 connected to the outlet port 60. The inlet and outlet lines 65 and 66 are preferably connected to the ports 56 and 60 by metal hose nipples 67 with rubber O-rings 68 at the plastic interface.

The valve 28 operates in a known manner in response to rotation of the input shaft 16 with the vehicle steering wheel. When the input shaft 16 rotates with the steering wheel in a first direction about the axis 23, it rotates slightly relative to the pinion gear 24. The torsion bar 30 flexes to permit such relative rotation of the input shaft 16 and the pinion gear 24. The valve 28 responds to the resulting rotational displacement by opening hydraulic fluid flow paths that extend through the valve 28 from the inlet passage 54 to the first two-way flow passage 50. The valve simultaneously opens hydraulic fluid flow paths that extend through the valve 28 from the second two-way flow passage 52 to the outlet passage 58. In this manner, the valve 28 communicates the pump 64 with the first chamber 36 in the power cylinder 34 to pressurize the first chamber 36, and simultaneously communicates the second chamber 38 in the power cylinder 34 with the reservoir 62 to vent the second chamber 38. A resulting flow of hydraulic fluid from the pump 64, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack 14 moves along the axis 21 with the piston 26, the pinion gear 24 rotates in meshing engagement with the rack teeth 32. The pinion gear 24 thus rotates about the axis 23 relative to the input shaft 16 in a follow-up manner so as to cancel the rotational displacement between the pinion gear 24 and the input shaft 16. The valve 28 responds by closing the previously opened hydraulic fluid flow paths. This equalizes the hydraulic fluid pressures acting on the piston 26 in the first and second chambers 36 and 38 in the power cylinder 34, and thus causes the piston 26 and the rack 14 to stop moving along the axis 21.

When the vehicle wheels are to be steered in a second direction, the input shaft 16 is rotated with the steering wheel in a second direction, and is again rotated slightly relative to the pinion gear 24 upon flexing of the torsion bar 30. The valve 28 responds by pressurizing the second chamber 38 and by simultaneously venting the first chamber 36. The piston 26 and the rack 14 then move axially to the left, as viewed in FIG. 1. A resulting follow-up rotation of the pinion gear 24 relative to the input shaft 16 causes the valve 28 again to equalize the hydraulic fluid pressures in the two chambers 36 and 38 in the power cylinder 34. The steering gear 10 thus effects steering movement of the vehicle wheels in directions and amounts corresponding to the directions and amounts of rotation of the steering wheel and the input shaft 16.

The valve 28 is contained in a tubular portion 69 of the housing 12 which functions as a valve housing. As shown in greater detail in FIG. 2, the valve 28 includes a valve core 70 and a valve sleeve 72. The valve core 70 is defined by a portion of the input shaft 16, and has four recesses 74 at locations that are equally spaced from each other circumferentially about the vertical axis 23. The valve sleeve 72 is connected with an upper end portion 76 of the pinion gear 24 (FIG. 1) in a known manner, and thus rotates with the pinion gear 24 relative to the input shaft 16.

Figure 2:
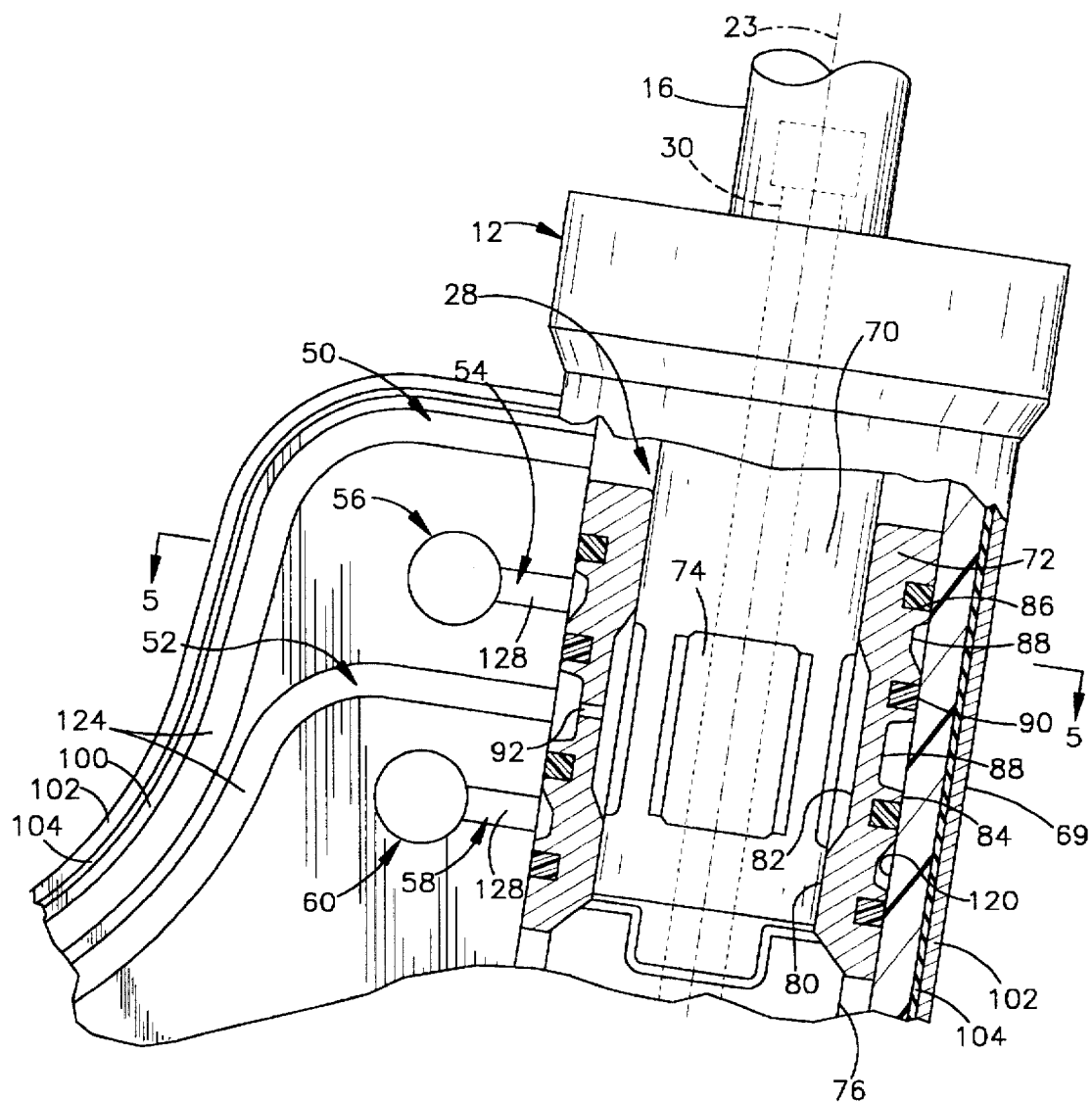
FIG. 2 is an enlarged partial view, partly in section, of the steering gear of FIG. 1.

An inner surface 80 of the valve sleeve 72 has a plurality of recesses 82. An outer surface 84 of the valve sleeve 72 has a plurality of circumferentially extending grooves 86 and recesses 88. A corresponding plurality of ring seals 90 are received in the grooves 86 to seal the recesses 88 from each other. Passages 92, one of which is shown in FIG. 2, communicate certain recesses 88 at the outer surface 84 of the valve sleeve 72 with certain recesses 82 at the inner surface 80 of the valve sleeve 72. Accordingly, the valve core 70 and the valve sleeve 72 together define hydraulic fluid flow paths that extend through the valve 28 between the passages 50, 52, 54, and 58 in the housing 12. Such parts of a hydraulic fluid control valve are known in the art.

When the input shaft 16 and the pinion gear 24 rotate relative to each other, as described above, the valve core 70 rotates relative to the valve sleeve 72. The recesses 74 on the valve core 70 thus rotate relative to the recesses 82 at the inner surface 80 of the valve sleeve 72. The hydraulic fluid flow paths extending through the valve 28 between the passages 50, 52, 54, and 58 are then adjusted so that certain flow paths become relatively restricted and certain flow paths become relatively unrestricted. Pressurized flows of hydraulic fluid are thereby directed through the valve 28 between the reservoir 62, the pump 64, and the chambers 36 and 38 in the power cylinder 34, as described above with reference to FIG. 1.

Figure 3:
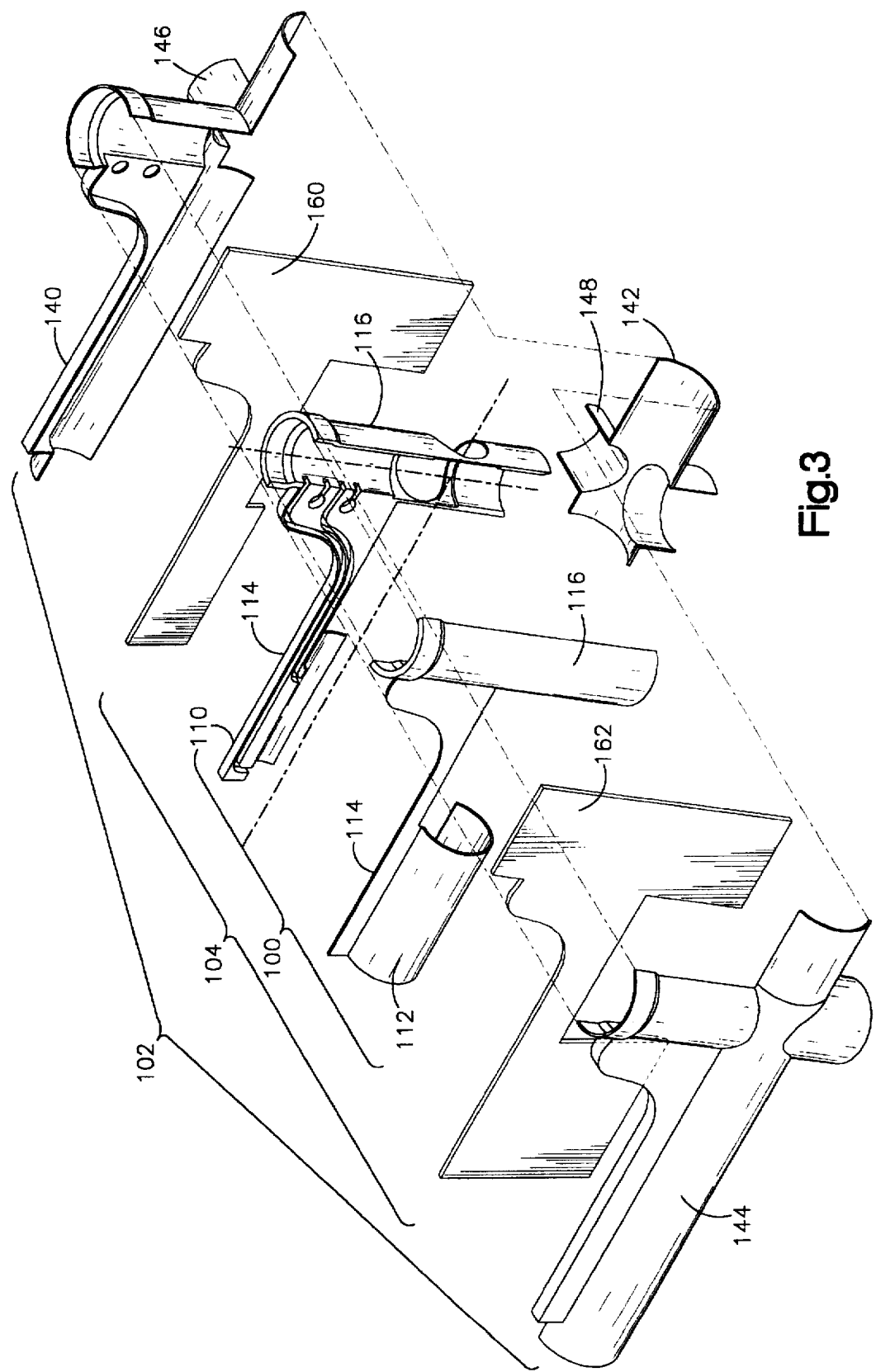
FIG. 3 is an exploded perspective view of parts of the steering gear of FIG. 1.

As shown in FIGS. 1 and 2, the housing 12 is a unitary laminated structure with an inner layer 100, an outer layer 102, and an intermediate layer 104. The inner layer 100 is formed of molded plastic material, and is most preferably formed of nylon. For example, the inner layer 100 can be formed of 6/6 nylon such as CTI NN-40 CF injection grade nylon comprising approximately 40% carbon fiber reinforcing material. The inner layer 100 can also be formed of polyester or any other suitable plastic material. The outer layer 102 is formed of metal material, and is most preferably formed of 1008 steel. The intermediate layer 104 is formed of incompressible elastomeric material, and is most preferably formed of a soft (e.g. 50 Shore A) peroxide cured EPDM rubber with a high strain capability (e.g. 200% biaxial). Other preferred materials for the intermediate layer include neoprene and the like. Each of the layers 100, 102, and 104 has sections which, as shown in the exploded view of FIG. 3, are prefabricated as separate parts.

The inner layer 100 has a pair of opposed sections 110 and 112, each of which has a horizontal portion 114 and a relatively vertical portion 116. When the two opposed sections 110 and 112 are joined together to define the inner layer 100 of the assembled housing 12, their horizontal portions 114 together define the power cylinder 34 (FIG. 1). Specifically, the horizontal portions 114 of the two opposed sections 110 and 112 together define a first cylindrical inner surface 118 of the inner layer 100. The first cylindrical inner surface 118 is centered on the axis 21, and defines the radially outer boundary of the two chambers 36 and 38 in the power cylinder 34. The first cylindrical inner surface 118 has a smooth finish throughout the lengths and circumferences of the two chambers 36 and 38 so as to define a smooth bore for the piston 26 to move axially in sliding contact with the inner layer 100 at the surface 118.

The relatively vertical portions 116 of the opposed sections 110 and 112 similarly define a second cylindrical inner surface 120 (FIG. 2) of the inner layer 100 at the valve housing 69. The second cylindrical inner surface 120 is centered on the axis 123 and defines the radially outer boundaries of the fluid flow paths that extend through the recesses 88 in the valve sleeve 72. Like the first cylindrical inner surface 118, the second cylindrical inner surface 120 has a smooth finish entirely around, and at least partially along, the corresponding axis 23. The second cylindrical inner surface 120 of the inner layer 100 thus supports the cylindrical outer surface 84 of the valve sleeve 72 in rotational sliding contact.

Figure 4:
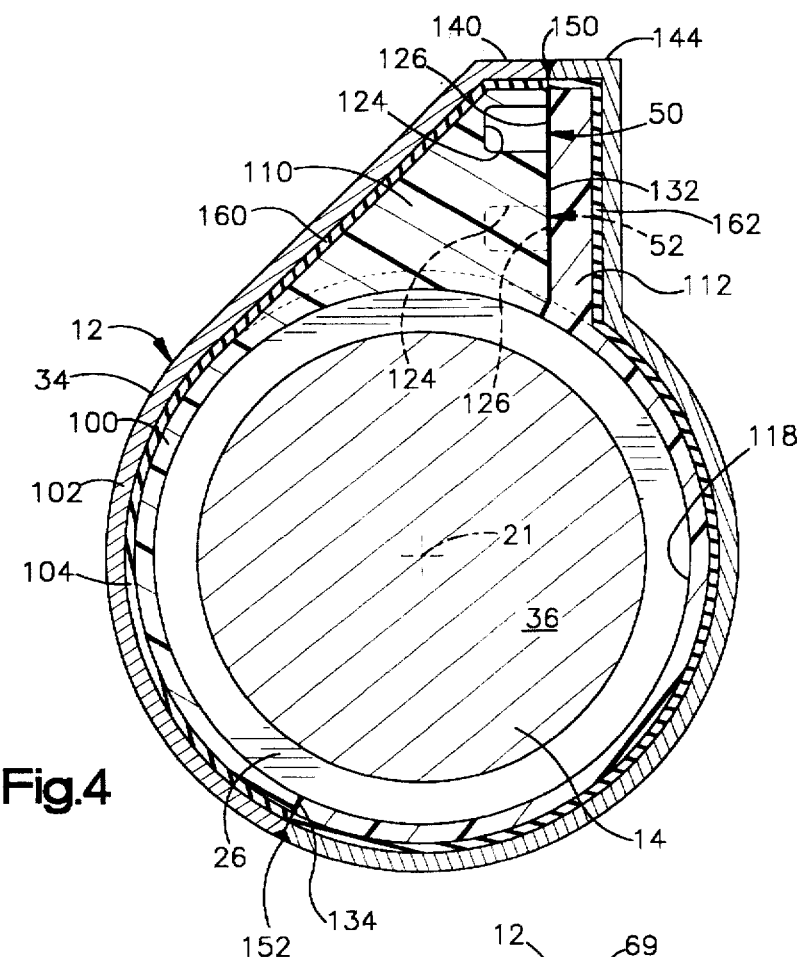
FIG. 4 is a view taken on line 4—4 of FIG. 1.

As noted above, the hydraulic fluid flow passages 50, 52, 54, and 58 also are defined by inner surface portions of the housing 12. As best shown in FIG. 4, the first and second two-way flow passages 50 and 52 are defined by, and between, opposed surfaces 124 and 126 of the two opposed sections 110 and 112 of the inner layer 100. The inlet and outlet passages 54 and 58 (FIGS. 2 and 5) are similarly defined by and between opposed surfaces 128 and 130 of the two opposed sections 110 and 112.

Figure 5:
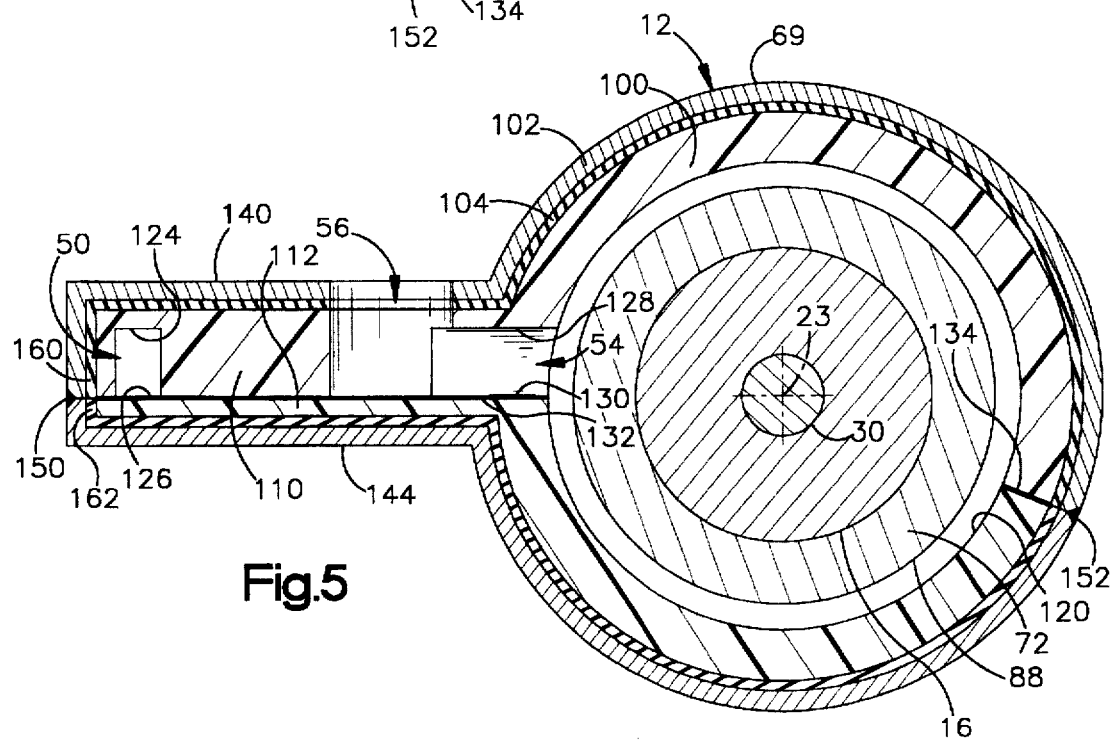
FIG. 5 is a view taken on line 5—5 of FIG. 2.

As best shown in FIGS. 4 and 5, the two opposed sections 110 and 112 of the inner layer 100 abut each other, and are joined together, at bonded seams 132 and 134 which extend throughout their lengths and heights on opposite sides of the axes 21 and 23. The opposed sections 110 and 112 are preferably bonded to each other at the seams 132 and 134 by solvent welds, but can alternatively be joined together by any other suitable fastening method and structure known in the art. The cylindrical inner surfaces 118 and 120 can be finished with their smooth contours either before or after the opposed sections 110 and 112 are fastened together.

The outer layer 102 of the housing 12 has three sections 140, 142, and 144. When the three sections 140, 142, and 144 of the outer layer 102 are joined together, they surround and enclose the other layers 100 and 104 within the laminated structure of the housing 12. The outer layer 102, which is formed of thin (e.g. 0.05 in.) sheet metal (most preferably steel), can then provide substantially all of the strength and rigidity needed for the housing 12 to support the rack 14, the pinion gear 24, and the other parts of the steering gear 10, as well as to contain the hydraulic fluid at the elevated temperature and pressure levels needed for the steering gear 10 to operate as described above.

As shown in FIG. 3, the first and second sections 140 and 142 of the outer layer 102 define respective portions 146 and 148 of a short, horizontally projecting cylindrical portion of the housing 12 for supporting a spring loaded rack yoke mechanism (not shown). As known in the art, such a mechanism biases the rack 14 transversely against the pinion gear 24 so that the rack teeth 32 mesh firmly with the pinion gear 24. A pair of weld joints 150 and 152 hold the first and third sections 140 and 144 of the outer layer 102 together along their abutting edges. A similar pair of weld joints (not shown) likewise holds the second section 142 together with the first and third sections 140 and 144 along the corresponding abutting edges.

The intermediate layer 104 has two opposed sections 160 and 162. The two opposed sections 160 and 162 of the intermediate layer 104 originally have substantially uniform thicknesses. Importantly, the two opposed sections 160 and 162 of the intermediate layer 104 become compressively loaded between the inner and outer layers 100 and 102 when the sections 140 and 144 of the outer layer 102 are moved into their adjoining positions in the assembled housing 12. When the two opposed sections 160 and 162 of the intermediate layer 104 are compressively loaded in this manner, their incompressible elastomeric materials are forcefully constricted and extended such that the intermediate layer 104 tightly fills the space in which it is located between the other layers 100 and 102.

In accordance with the foregoing feature of the present invention, the intermediate layer 104 ensures that all three layers 100, 102 and 104 fit closely and firmly against each other without slipping in the laminated structure of the assembled housing 12. This is an important feature of the invention because it is not practicable to manufacture the relatively inelastic inner and outer layers 100 and 102 precisely enough for them to abut each other firmly and continuously throughout their opposed, adjacent surface areas. The intermediate layer 104 also functions to insulate the weld joints 150 and 152 from the heat of the pressurized hydraulic fluid, and to damp vibrations for noise reduction. Moreover, the intermediate layer 104 preferably has a roughly textured (e.g. ±0.1 mm texture) surface abutting the outer layer 102 to accommodate thermal expansion.

From the above description of the invention, those skilled in the art will perceive improvements, changes and modifications. For example, the number and/or configurations of the prefabricated sections of the layers 100, 102 and 104 of the housing 12 can vary from those described above with reference to the preferred embodiment of the invention. Such improvements, changes and modifications within the skill of the art are intended to be covered by the appended claims.

Having described the invention, the following is claimed:

1. Apparatus comprising:

housing means for containing hydraulic fluid under pressure in a hydraulic power steering gear, said housing means comprising a tubular structure with a longitudinal central axis and layers extending circumferentially around said axis, said layers including an inner layer, an outer layer, and an intermediate layer between said inner and outer layers;

said inner layer being formed of plastic material and having an inner surface defining an outer boundary of a space for containing the hydraulic fluid under pressure;

said outer layer being formed of metal material and comprising pressure-bearing means for resisting said pressure; and said intermediate layer being formed of elastomeric material and being compressively loaded radially between said inner and outer layers.

2. Apparatus as defined in claim 1 wherein said inner surface of said inner layer comprises means for supporting a piston for movement along said axis in sliding contact with said inner surface.

3. Apparatus as defined in claim 1 wherein said inner surface of said inner layer comprises means for supporting a valve sleeve for rotation about said axis in sliding contact with said inner surface.

4. Apparatus as defined in claim 1 wherein said plastic material comprises reinforced nylon.

5. Apparatus as defined in claim 1 wherein said metal material is steel.

6. Apparatus as defined in claim 1 wherein said elastomeric material is EPDM rubber.

7. Apparatus as defined in claim 1 wherein each of said layers has at least two prefabricated sections which adjoin each other at axially extending seams.

8. Apparatus comprising:

housing means for containing hydraulic fluid under pressure in a hydraulic power steering gear, said housing means comprising a laminated structure with a plastic inner layer, a metal outer layer, and an elastomeric intermediate layer compressively loaded between said inner and outer layers;

said laminated structure having a first tubular portion containing hydraulic fluid under pressure in at least one variable volume hydraulic fluid chamber adjacent to a piston; and said laminated structure further having a second tubular portion containing hydraulic fluid under pressure in a plurality of flow passages adjacent to a valve sleeve in a hydraulic fluid control valve.

9. Apparatus as defined in claim 8 wherein said inner layer of said laminated structure has surface portions defining a fluid flow passage communicating said chamber with said passages.

10. Apparatus as defined in claim 8 wherein said piston is fixed to a steering rack having rack teeth, said laminated structure further comprising means for containing a pinion gear which is rotatable with said valve sleeve in meshing engagement with said rack teeth.

11. Apparatus as defined in claim 8 wherein said inner layer of said laminated structure is formed of reinforced nylon, said outer layer being formed of steel, said intermediate layer being formed of EPDM rubber.

12. Apparatus as defined in claim 8 wherein each of said layers has at least two prefabricated sections which adjoin each other in said laminated structure.

13. Apparatus comprising:

an elongate steering rack having rack teeth;

a hydraulic power cylinder having a first cylindrical inner surface surrounding at least one variable volume hydraulic fluid chamber;

a piston which is fixed to said rack, said piston being supported for movement in said power cylinder in sliding contact with said first cylindrical inner surface;

a rotatable input member;

a hydraulic fluid control valve responsive to rotation of said input member, said valve defining hydraulic fluid flow paths extending through said valve; and a valve housing having a second cylindrical inner surface surrounding said fluid flow paths;

said valve housing and said power cylinder being portions of a unitary laminated structure having a plastic inner layer, a metal outer layer, and an elastomeric intermediate layer compressively loaded between said inner and outer layers.

14. Apparatus as defined in claim 13 wherein said inner layer of said laminated structure comprises means for defining at least one hydraulic fluid flow passage communicating said power cylinder with said valve housing.

15. Apparatus as defined in claim 13 wherein said laminated structure contains a pinion gear in meshing engagement with said rack teeth.

16. Apparatus as defined in claim 13 wherein said inner layer is formed of reinforced nylon, said outer layer being formed of steel, said intermediate layer being formed of EPDM rubber.

17. Apparatus as defined in claim 13 wherein each of said layers has at least two prefabricated sections which adjoin each other in said laminated structure.

\* \* \* \* \*